United States Patent
Luo

(10) Patent No.: US 8,426,772 B2
(45) Date of Patent: Apr. 23, 2013

(54) AUXILIARY POWER SUPPLY FOR A WELDING MACHINE

(75) Inventor: Lifeng Larry Luo, Solon, OH (US)

(73) Assignee: Lincoln Global, Inc., Industry, CA (US)

( * ) Notice: Subject to any disclaimer, the term of this patent is extended or adjusted under 35 U.S.C. 154(b) by 845 days.

(21) Appl. No.: 12/552,782

(22) Filed: Sep. 2, 2009

(65) Prior Publication Data

US 2011/0049115 A1      Mar. 3, 2011

(51) Int. Cl.
*H05B 1/00* (2006.01)
*H05B 3/42* (2006.01)

(52) U.S. Cl.
USPC ............ 219/130.21; 219/130.31; 219/130.32; 219/130.33; 219/130.4

(58) Field of Classification Search ............. 219/130.21, 219/130.31, 130.32, 130.33, 130.4
See application file for complete search history.

(56) References Cited

U.S. PATENT DOCUMENTS

| | | | |
|---|---|---|---|
| 3,567,902 A | 3/1971 | Stearns et al. | |
| 5,166,567 A | 11/1992 | Kneisley et al. | |
| 5,343,017 A * | 8/1994 | Karino et al. | 219/130.4 |
| 5,645,741 A * | 7/1997 | Terayama et al. | 219/130.4 |
| 5,861,604 A | 1/1999 | McLean et al. | |
| 5,991,180 A | 11/1999 | Vogel et al. | |
| 6,130,398 A | 10/2000 | Schneider et al. | |
| 6,153,855 A | 11/2000 | Renner et al. | |
| 6,348,671 B1 | 2/2002 | Fosbinder et al. | |
| 6,469,276 B1 | 10/2002 | Renner et al. | |
| 6,469,401 B2 | 10/2002 | Beeson et al. | |
| 6,531,685 B2 | 3/2003 | Smith | |
| 6,667,600 B2 | 12/2003 | Fogleman | |
| 6,674,179 B2 | 1/2004 | Beeson et al. | |
| 6,818,860 B1 | 11/2004 | Stava et al. | |
| 7,211,764 B2 | 5/2007 | Leisner et al. | |
| 7,319,206 B2 | 1/2008 | Thommes | |
| 2006/0157459 A1 | 7/2006 | Fosbinder | |
| 2006/0198171 A1 | 9/2006 | Samodell | |
| 2006/0213890 A1 | 9/2006 | Kooken et al. | |
| 2007/0278993 A1 | 12/2007 | Vogel | |

OTHER PUBLICATIONS

International Search Report and Written Opinion from PCT/IB10/02172 dated Jan. 10, 2011.

(Continued)

*Primary Examiner* — Toan Le
(74) *Attorney, Agent, or Firm* — Calfee, Halter & Griswold LLP

(57) ABSTRACT

A electric welding machine having an auxiliary power output, and a method for controlling the auxiliary power output on a welding machine is provided. In one embodiment, the system includes a main transformer having a first secondary winding in circuit communication with a welder power output and a second secondary winding in circuit communication with an auxiliary power supply having an auxiliary power output. The auxiliary power supply includes an input for monitoring the welder power output to determine if the welder power output is on; circuitry for determining whether a surge or spike in demand is present at the auxiliary power output; and circuitry for limiting the available power to the auxiliary power output if certain conditions are satisfied. One method includes monitoring the demand on an auxiliary power output, monitoring a welding power output, determining whether there is a spike in the demand on the auxiliary power output that is above a first limit, and reducing the available power to the auxiliary power output if the spike is above the first limit and the welding power output is energized.

18 Claims, 7 Drawing Sheets

OTHER PUBLICATIONS

Mohan, Ned; Undeland, Tore M; and Robbins, William P.; Power Electronics, Coverters, Applications and Design (3d Ed.); Chapter 8, Switch-Mode dc-ac Inverters: dc—Sinusoidal ac; Copyright 2003, John Wiley & Sons, Inc.; United States.

Miller Electric Mfg. Co.; Miller Axcess 450 Owner's Manual (OM-211 434B); Copyright 2003, Miller Electric Mfg. Co.; United States.

* cited by examiner

AUXILIARY POWER SUPPLY FOR A WELDING MACHINE

FIELD

Embodiments of the present invention relate generally to welding machines, and more specifically to auxiliary power supplies for welding machines.

BACKGROUND

Electric arc welders are used in numerous industries, back yard shops and countries outside of the United States, each of which may have a different power source available. Such power supplies may range from 200 VAC to 600 VAC, may have a frequency of 50 Hz or 60 Hz, and may be three phase or single phase. Lincoln Electric has developed novel three stage power sources for electric arc welders that allows the welder to operate with any of these power supplies. Often the operator has a need to use a power tool, or other device that operates on 115 VAC and no such power source is available.

SUMMARY

An electric welding machine with an auxiliary power supply is provided. In one embodiment, the available power to the auxiliary power supply is limited if there is a surge or spike in the current draw that exceeds a set limit. In one embodiment there are two surge or spike limits, a lower spike limit that triggers a reduction in available power if the welder output is on, and a higher spike limit that triggers a reduction in available power if the welder output is off. In one embodiment, an electric welding machine includes an input for receiving a voltage of between about 200 and 600 volts AC. The input is in circuit communication with an AC to DC converter, an inverter and a main transformer that provides isolation from the input. The main transformer includes a first secondary winding in circuit communication with a welder power output and a second secondary winding in circuit communication with an auxiliary power supply having an auxiliary power output. The auxiliary power supply includes an input for monitoring the welder power output to determine if the welder power output is on, a pulse width modulation circuit for providing a pulsed input to a filter, and an input for monitoring the output of the auxiliary power output. The pulsed input to the filter provides a maximum available auxiliary power output under normal conditions and reduces the available auxiliary power output if there is a surge or spike on the auxiliary power output.

In another embodiment, the electric welder has at least one transformer for providing a first reduced AC voltage to a welding power supply having a welding output and a second reduced AC voltage to an auxiliary power supply having an auxiliary output. The auxiliary power supply may include a rectifier for converting the second reduced AC voltage to a DC voltage, switches for intermittently providing a positive DC voltage to a first filter input, such as, for example, the inductor of an LC filter, and a negative DC voltage to a second filter input, such as, for example, the capacitor of the LC filter, and for intermittently providing a negative DC voltage to the first filter input and a positive DC voltage to the second filter input. The auxiliary power supply may include control circuitry operating at a frequency of greater than about 20 kHz for pulsing the switches to provide variable pulse widths to the filter. The filter provides an AC power output having a substantially sinusoidal wave form when a first pulse width is applied to the filter.

In one embodiment a method for controlling an auxiliary power output on a welding machine is provided. The method includes monitoring the demand on an auxiliary power output, monitoring a welding power output, determining whether there is a spike in the demand on the auxiliary power output that is above a first limit, and reducing the available power to the auxiliary power output if the spike is above the first limit and the welding power output is energized.

BRIEF DESCRIPTION OF THE DRAWINGS

These and other features and a more thorough understanding of the invention may be achieved by referring to the following description, taken in conjunction with the drawings, wherein.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, for example, a CPU, are in circuit communication. Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic", synonymous with "circuit" as used herein includes, but is not limited to hardware, firmware, software and/or combinations of each to perform a function(s) or an action(s). For example, based on a desired application or needs, logic may include a software controlled microprocessor or microcontroller, discrete logic, such as an application specific integrated circuit (ASIC), or other programmed logic device. Logic may also be fully embodied as software. The circuits identified and described herein may have many different configurations to perform the desired functions.

The values identified in the detailed description are exemplary and they are determined as needed for a particular welder design. Accordingly, the inventive concepts disclosed and claimed herein are not limited to the particular values or ranges of values used to describe the embodiments disclosed herein.

Figure 1:
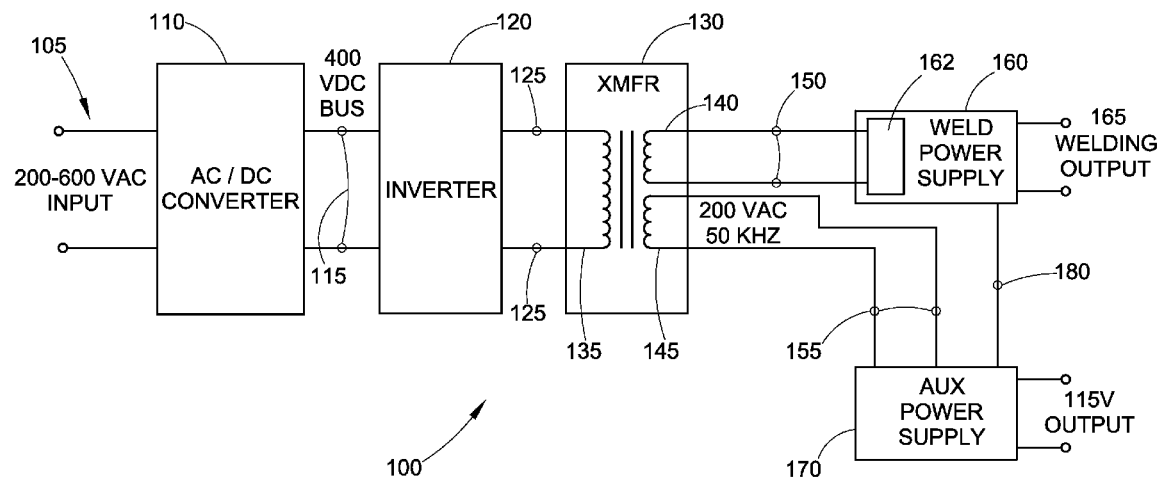
FIG. 1 is an exemplary block diagram of a welder having an auxiliary power supply according to an embodiment of the invention.

FIG. 1 is an exemplary block diagram of an embodiment of a welder 100 having an auxiliary power supply 170 in accordance with one embodiment of the present invention. Welder 100 may include an AC to DC converter 110, which includes an input 105 for receiving AC power. AC to DC converter 110 is configured to receive a "universal" voltage, such as, for example, voltages that range from about 200 to about 600 VAC and voltages that may be either three phase or single phase, 50 Hz or 60 Hz. The output of AC to DC converter 110 is in circuit communication with DC bus 115, and preferably, provides an output of about 400 VDC, and DC bus 115 is in circuit communication with inverter 120. Inverter 120 converts the 400 VDC signal into a 400 VAC, 50 kHz signal which is in circuit communication with the primary winding 135 in main power supply transformer 130. Main power supply transformer 130 has a secondary winding 140 that is in circuit communication with rectifier 162 in welding power supply 160. The primary winding 135 and secondary winding 140 may have a 4:1 ratio. Accordingly, the 400 VAC, 50 kHz input signal to the main power supply transformer 130 is converted to a 100 VAC, 50 kHz input to rectifier 162 of welding power supply 160. For additional information with respect to exemplary embodiments of the above described circuitry, see U.S. patent application Ser. No. 11/087,179, filed on Mar. 24, 2005, published on Sep. 28, 2006 as U.S. Pub. No. 2006/0213890 and is assigned to Lincoln Global, Inc, which is incorporated by reference herein in its entirety. This is but one example of many different welding power supplies that may be used. The inventive concepts disclosed herein are not limited to a welding machine having a universal input voltage.

Main power supply transformer 130 includes another secondary winding 145 which is in circuit communication with rectifier 205 (FIG. 2) in the auxiliary power supply 170. The primary winding 135 and secondary winding 145 may have a 2:1 ratio. Accordingly, the 400 VAC input to the main power supply transformer 130 is converted to a 200 VAC, 50 kHz input to rectifier 205 in auxiliary power supply 170. The main power supply transformer 130 is energized when the welder is powered up regardless of whether or not the welder output 165 is on or off. Accordingly, power for the auxiliary power supply 170 is always available when the welder 100 is powered on. The additional secondary winding 145 eliminates the need for an additional transformer, and can be added to all welding machines at little cost regardless of whether or not the eventual customer orders the optional auxiliary power output. Another advantage of this embodiment is that the main transformer primary bus is independent of the welder 100 input voltage 105, accordingly the secondary winding 145 is also independent of the input voltage 105. Thus, there is no need to reconnect, or change settings on auxiliary power supply 170 for different ranges of voltage inputs 105. Auxiliary power supply 170 may be offered as an option on the welder 100, and in one embodiment, may optionally be provided for customers to install after the original purchase if the original welder has the additional secondary winding 145. Optionally, however, a second inverter and transformer (not shown) could be used to power the auxiliary power supply, and can be connected to the DC bus 115.

Figure 2:
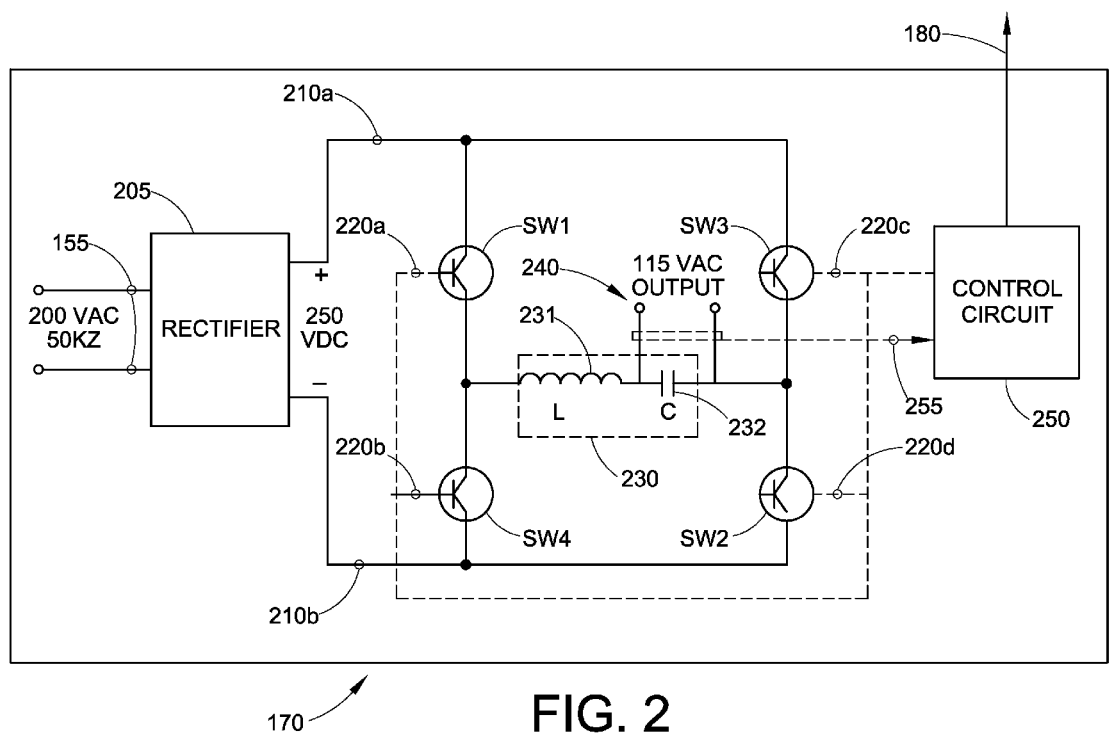
FIG. 2 is an exemplary block diagram of an auxiliary power supply for a welder according to an embodiment of the invention.

FIG. 2 illustrates an exemplary embodiment of an auxiliary power supply 170. Auxiliary power supply 170 is configured to receive an AC input, such as, for example, the aforementioned 200 VAC, 50 kHz signal, which is rectified by rectifier 205 to provide about a 200 VDC output. The positive leg of the 200 VDC output is in circuit communication with bus 210a and the negative leg is in circuit communication with bus 210b. Bus 210a is in circuit communication with paired switches SW1 and SW3 and bus 210b is in circuit communication with paired switches SW2 and SW4. The output of SW1 and SW4 are in circuit communication with one input of filter 230, such as, for example, the inductor 231 and the output of SW2 and SW3 are in circuit communication with the second input, such as, for example, the capacitor 232 of filter 230. Switches SW1, SW2, SW3, and SW4 are controlled by control circuit 250. Control circuit 250 also receives an input signal 255 from the filter output 240. Input signal 255 may be, for example, a current or voltage signal. Input signal 255 provides a feedback signal that may be used to determine one or more of the voltage, ripple, current draw, etc. In one embodiment, input signal is an analog voltage signal that is received by control circuit 250 which monitors the output voltage and voltage ripple.

Figure 3:
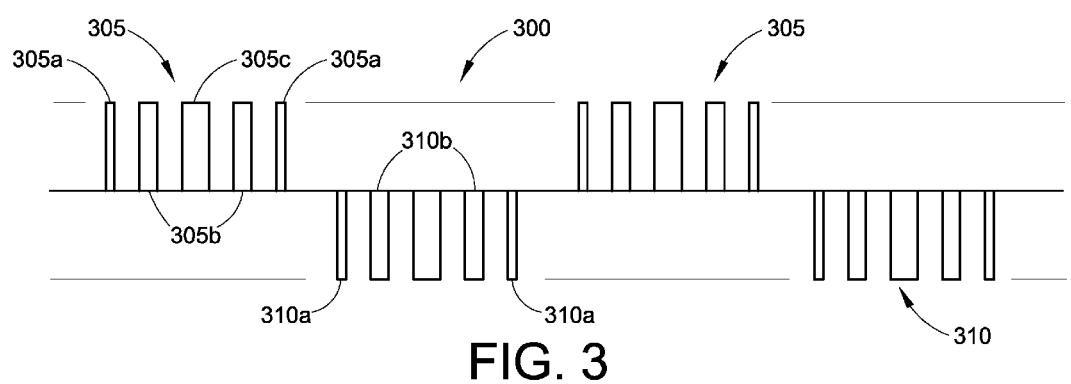
FIG. 3 is an exemplary diagram of a voltage signal applied to the input of the filter in an auxiliary power supply for a welder according to an embodiment of the invention.
Figure 4:
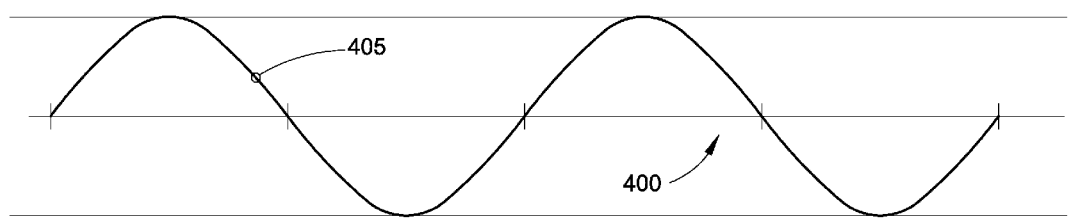
FIG. 4 is an exemplary diagram of the output voltage signal that corresponds to the voltage signal applied to the input of the filter in an auxiliary power supply of FIG. 3.

Switches SW1, SW2, SW3, and SW4 are energized in alternate sequence by gating pulses on lines 220a, 220b, 220c and 220d. Control circuit 250 turns alternate pairs of switches "on" and "off" at a high frequency, such as, for example, at about 20 kHz or above, and in one embodiment at about 75 kHz. For example, control circuit 250 may pulse switches SW1 and SW2 "on" a number of times to create a series of positive voltage pulses, such as, for example, pulses 305 (FIG. 3), and then control circuit 250 may pulse switches SW3 and SW4 "on" a series of time to create a series of negative pulses, such as, for example, pulses 310. This process is repeated creating a series of positive pulses followed by a series of negative pulses. In one embodiment, the pulse widths increase and decrease to at least partially create the substantially sinusoidal output illustrated in FIG. 4. For example, pulses 305 and 310 may include one or more first pulse widths 305a and 310a respectively, one or more wider pulse widths 305b, and 310b, and one or more widest pulse widths 305c and 310c. Thus, the positive pulse widths 305 increase from 305a to 305b to 305c and decrease from 305c to 305b to 305a corresponding to the sinusoidal wave form of FIG. 4. Similarly, negative pulse widths increase from 310a to 310b to 310c and decrease from 310c to 310b to 310a corresponding to the sinusoidal wave form of FIG. 4. (For simplicity only three different widths of pulses are illustrated, however any desired number of different pulse widths may be used). These voltage pulses are applied to the input of filter 230. Filter 230 contains an inductor 231 and a capacitor 232, thus, the current and voltage output of filter 230 cannot change instantaneously. Accordingly, the output of filter 230 is a sinusoidal output as illustrated in FIG. 4. The filter 230 components may be selected to generate, for example, a 115 VAC, 60 Hz output. Preferably the output has minimal voltage ripple of, for example, less than about 5% of total output voltage. Control circuit 250 monitors output 240 of the auxiliary power supply 170 using the input signal 255 and adjusts the pulsing of switches SW1, SW2, SW3, and SW4 to maintain a substantially consistent sinusoidal 115 VAC output. Output 240 of Filter 230 is in circuit communication with a receptacle located on, for example, the back panel of the welding machine (not shown).

A sinusoidal output, as opposed to a square wave output, is preferred. Many power tools operate more efficiently on a voltage source with a sinusoidal wave form and run hotter when operated on a square wave. In addition, some equipment does not operate properly at all on a square wave form, such as, for example, a radio or television where a square voltage wave causes harmonic noise, power tools with solid state variable speed control, some battery chargers and fluorescent lights.

Figure 5:
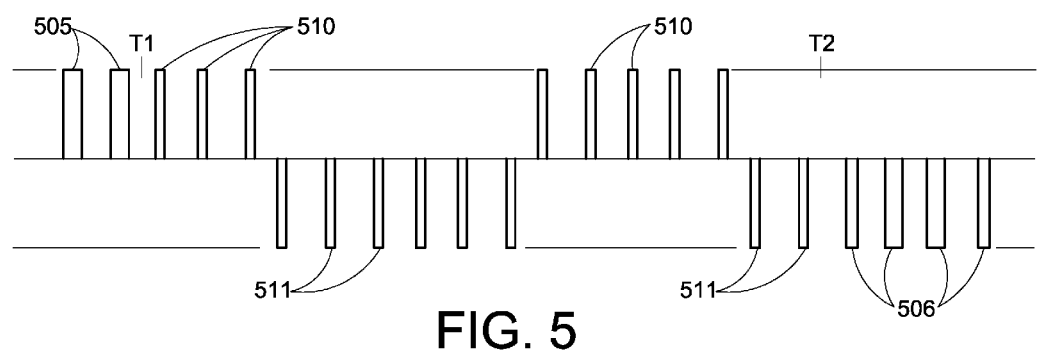
FIG. 5 is an exemplary diagram of a voltage signal applied to the filter in an auxiliary power supply for a welder according to an embodiment of the invention.
Figure 6:
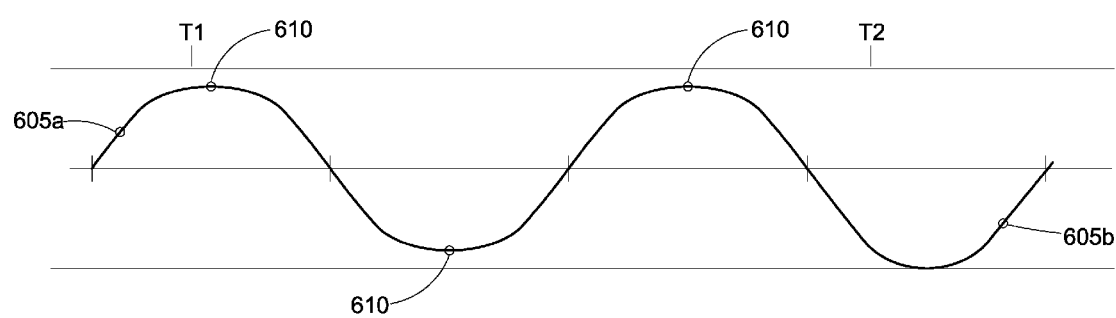
FIG. 6 is an exemplary diagram of the output voltage signal that corresponds to the voltage signal applied to the input of the filter in an auxiliary power supply of FIG. 5.

The primary purpose of the electric welder is to provide quality welds. Since the auxiliary power supply 170 shares the primary DC bus 115 with the welding output 165, too much current draw by, for example, a power tool, on the auxiliary power output 240 may lower the DC bus 115 and could affect the welding output if it is on. Accordingly, in one embodiment, control circuit 250 limits the current available at output 240 when the welder is in operation. Control circuit 250 monitors whether or not the welder is in operation through signal 180. In one embodiment, signal 180 is energized when the welder output 165 is on. Accordingly, if control circuit 250 detects a voltage on signal 180, the welder output is on. The available output current may be reduced by narrowing the pulse width of the voltage input to the filter 230. For example, FIG. 5 illustrates a series of positive voltage pulses 505 having a first pulse width. (In actual practice, pulse widths 505 may include a number of different pulse widths to aid in creating the sinusoidal output.) At time T1 the welder is put into operation and control circuit 250 narrows the width of the pulses 510, 511 thereby limiting the current available to the input of filter 230. At T2, the welder is no longer being operated and control circuit 250 widens the width of the pulse 506 back to its maximum value. FIG. 6 illustrates the output of the filter 230 that corresponds to the input of filter 230. At T1, the output voltage is clipped, or reduced due to the narrower pulse widths 510, 511, which limits the power, or current, available at output 240. At T2, the pulse widths 506 are widened and accordingly, output voltage 240 returns to the maximum setting and the wave form 610 reverts back to a substantially sinusoidal wave form.

In one embodiment, control circuit 250 monitors the voltage, or optionally the current, at output 240 for demand spikes. Some power tools, such as a grinder for example has a 15 amp peak operating current but can have over a 100 amp starting current within 100 microseconds of starting the grinder. Such a sudden current draw on the auxiliary power output 240 will lower the DC bus 115 and may effect the welding output 165 if it is on. Control circuit 250 monitors the voltage or current at output 240 and limits the power available by quickly reducing the width of the pulse, which limits the peak current as soon as control circuit 250 detects a spike that is over a set limit. In one embodiment, two or more spike limits may be set. For example, a first spike limit may be used when the welder output is on, and a second spike limit may be used when the welder power is off. Switches SW1, SW2, SW3 and SW4 are operated at a frequency of above about 20 kHz and the pulse width can be adjusted on a pulse-by-pulse basis within a few microseconds of detecting a spike that is above a set limit. The set spike limits may be a preselected value, or may be a programmed variable value, such as, for example, a percentage of the maximum available power.

Figure 7:
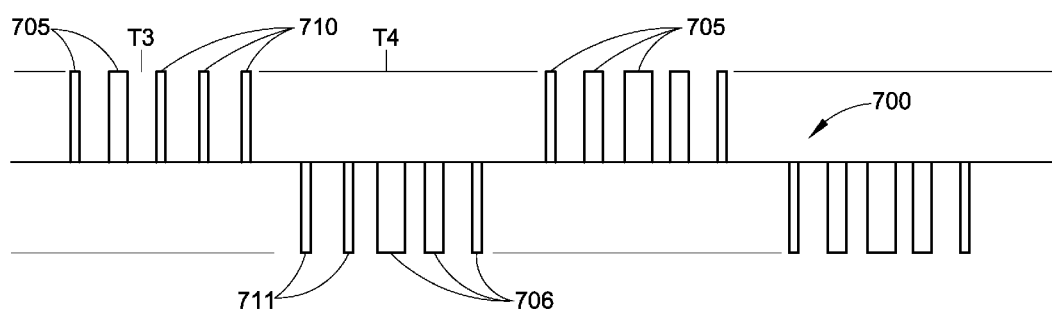
FIG. 7 is an exemplary diagram of a voltage signal applied to the filter in an auxiliary power supply for a welder according to an embodiment of the invention.
Figure 8:
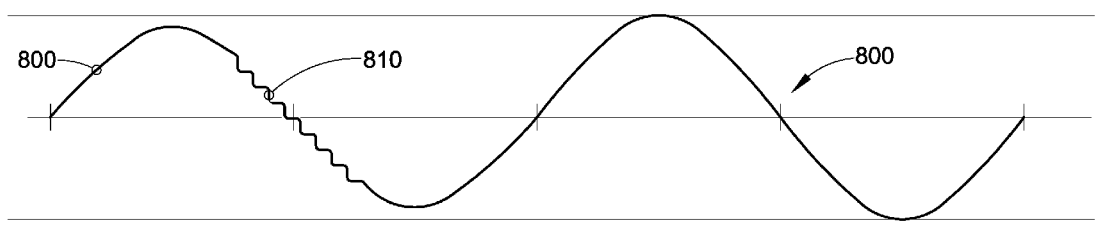
FIG. 8 is an exemplary diagram of the output voltage signal that corresponds to the voltage signal applied to the input of the filter in an auxiliary power supply of FIG. 7.

FIG. 7 illustrates the voltage pulses at the input to filter 230. In this embodiment, voltage pulse widths 705 are already reduced because the welder is in operation. (Initial reduction in the voltage pulse widths 705 when the welder is in operation is optional and not required). At T3, an operator starts a device, such as a grinder, with a high starting current. Control circuit 250 detects the high current draw, or voltage drop, and because switches SW1, SW2, SW3 and SW4 are pulsed at a frequency above about 20 kHz, and in one embodiment, at about 75 kHz, control circuit 250 can detect and limit the pulse width 710 within microseconds of detecting a high current draw and further limit the power available at output 240. At time T4, the starting current subsides and the control circuit 250 returns the pulse widths 705, 706 to the reduced setting used while the welder is in operation. Accordingly, even if a device having a high starting current is connected to the auxiliary power output 240, the voltage output 165 provided for welding remains generally constant. FIG. 8 illustrates the wave form at the filter output 240. The peak voltage of wave form 800 is clipped because the welder is in operation. Between T3 and T4, the wave form 810 may be substantially linear due to the shortened pulse widths 710, or have a small chop in the wave form.

Figure 9:
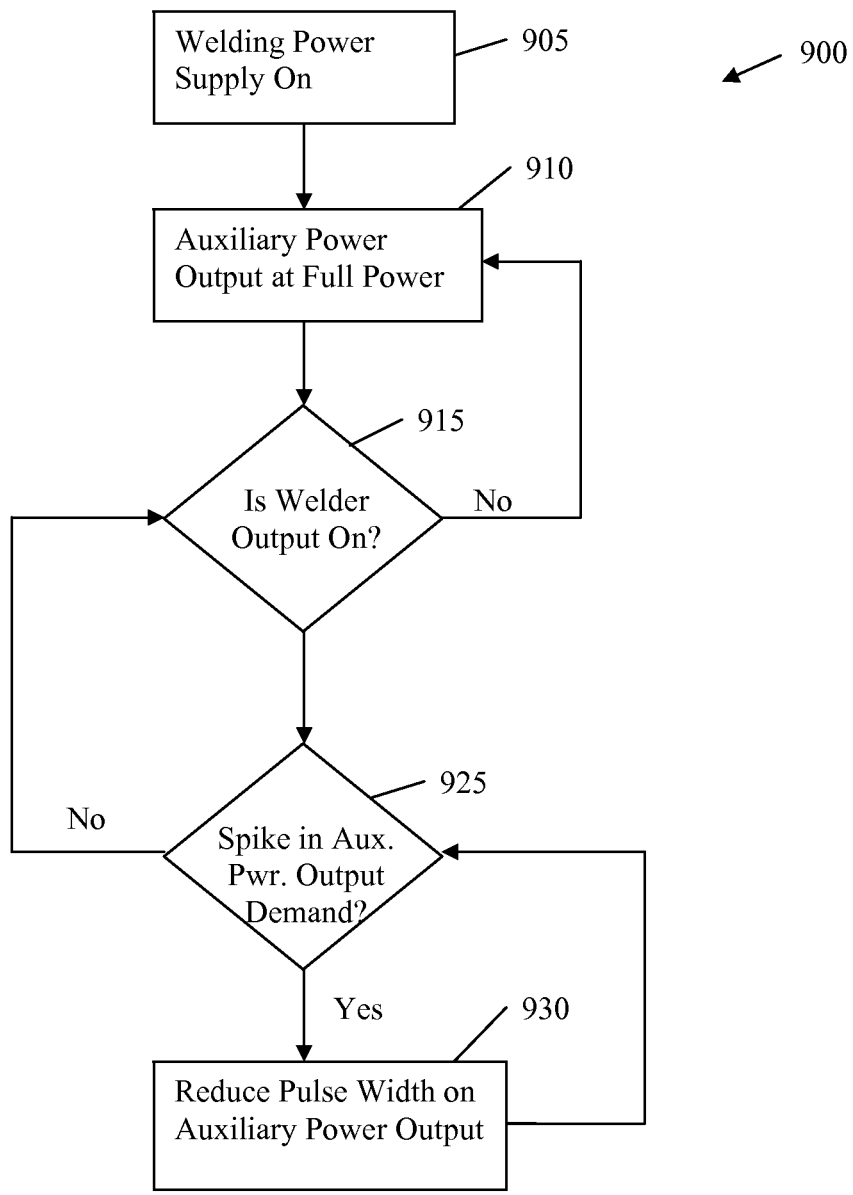
FIG. 9 is an exemplary flow chart of a logic diagram in accordance with one embodiment of an electric welder having an auxiliary power supply.

An exemplary flow chart of a logic diagram 900 for an embodiment of the present invention is provided in FIG. 9. At block 905 the welder is connected to a power supply and the main welder power is turned on. At block 910, the auxiliary power supply output is on at full power. A determination is made at block 915 of whether the welder output is "on" indicating that the welder in use. If the welder output is not on the logic returns to block 910 and the auxiliary power output remains on at full power. Another determination is made at block 915 to determine whether the welder output is on. Optionally, if the welder output is on, the voltage pulse width may be slightly reduced at this time (not shown). Generally, if the welder output is on, a determination is made at block 925 of whether or not there is a spike in the auxiliary power output demand. A spike may be caused by, for example, initial starting of a power tool, such as, for example, a grinder, which has a large starting current. If a spike is not present at block 925, a determination is again made at block 915 to determine whether the welder power output is on. If the welder power output is still on, a determination is made at block 925 of whether a spike is present in the auxiliary power output demand. If a spike is detected at block 925, the voltage pulse width is reduced at block 930. Control reverts to block 925 to determine whether a spike is still present and continues to loop until a spike is not present. Optionally, the loop may include re-determining whether the welder output is on and whether there is still a spike in the auxiliary output demand. Still yet, in one embodiment (not shown), if a spike is present for multiple determinations at block 935 or a set time limit is reached, the pulse widths are further reduced. Other combinations of determinations and controlling of the pulse widths may be used.

Figure 10:
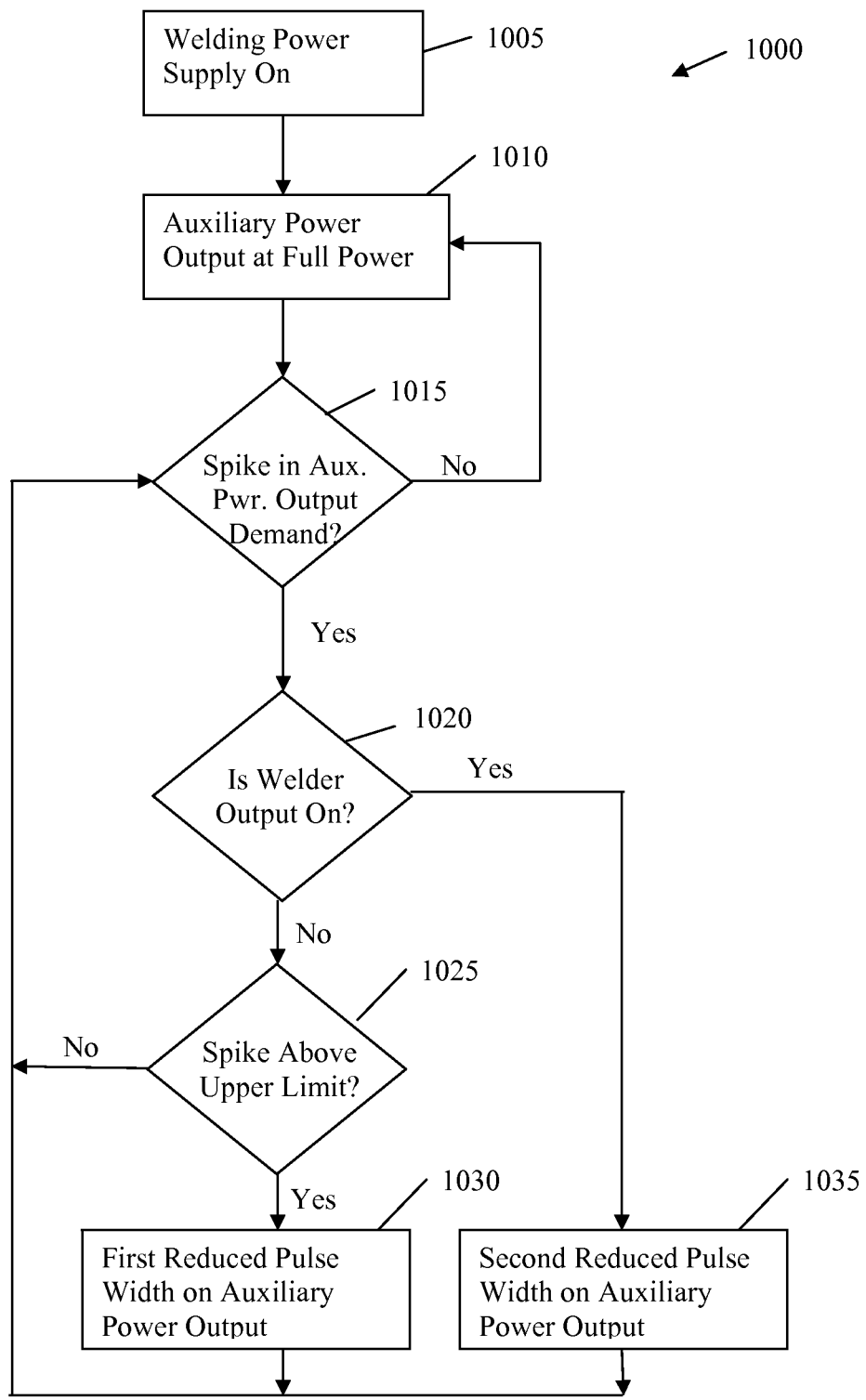
FIG. 10 is another exemplary flow chart of a logic diagram in accordance with one embodiment of an electric welder having an auxiliary power supply.

Another exemplary flow chart of a logic diagram 1000 for an embodiment of the present invention is provided in FIG. 10. At block 1005 the welder is connected to a power supply and the main welder power is turned on. At block 1010, the auxiliary power supply output is on at full power. At block 1015 a determination is made of whether there is a spike in the auxiliary output demand. If there is not, the auxiliary power output remains at full power. If a spike is detected at block 1015 a determination is made at block 1020 of whether the welder output is on. If the welder output is not on, a determination is made of whether the spike is above an upper limit at block 1025. The upper limit may be the same limit used to determine whether a spike occurred at block 1015, however, preferably, the upper limit used at block 1025 is set higher than the spike detection limit at block 1015 because the welder power output is not on and a slight dip in the input voltage will not have an effect on a weld. If the spike is not above the upper limit at block 1025 a determination is again made at block 1015 as to whether there is a spike in the auxiliary power output demand. If the spike is above the upper limit at block 1025, the pulse width is reduced to a first reduced pulse width at block 1030 and a determination is made at block 1015 of whether there is still a spike in the auxiliary output demand. If at block 1020 the welder output is on, the pulse width is reduced to a second reduced pulse width at block 1035 and control returns to block 1015 to determine whether there is a spike in the auxiliary power output demand. Preferably, the first reduced pulse width is greater than or equal to the second reduced pulse width. The logic returns to block 1015 and again determines if a spike is present.

The order in which the process flows herein have been described is not critical and can be rearranged while still accomplishing the same or similar results. Indeed, the process flows described herein may be rearranged, consolidated, and/or re-organized in their implementation as warranted or desired.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

I claim:

1. An electric welding machine comprising:
    a main transformer that provides isolation from a power input to the welding machine;
        the main transformer having a first secondary winding in circuit communication with a welder power output; and
        a second secondary winding in circuit communication with an auxiliary power supply having an auxiliary power output;
            the auxiliary power supply including:
                an input for monitoring the welder power output to determine if the welder power output is on;
                circuitry for monitoring the output of the auxiliary power output; and
                circuitry for reducing the available power to the auxiliary power output if there is a surge in power demand on the auxiliary power output that exceeds a set limit and the welder power output is on; and
        wherein the circuitry for reducing the available power to the auxiliary power output comprises pulse width modulation circuitry for providing a pulsed input to a filter, wherein the width of the pulse input is decreased to decrease the available power to the auxiliary power output.

2. The electric welding machine of claim 1 further comprising circuitry to adjust the pulse widths to maintain a substantially 115 volt 60 Hz sinusoidal output.

3. The electric welding machine of claim 1 further comprising circuitry for reducing the available power to the auxiliary power output if there is a surge in power demand that exceeds a second set limit and the welder power output is off.

4. The electric welding machine of claim 1 further comprising circuitry for initially reducing the available power to the auxiliary power output if the welder output is on and further reducing the power to the auxiliary power output if there is a surge in power demand that exceeds the set limit.

5. The electric welding machine of claim 1 wherein the auxiliary power supply comprises
    a rectifier for converting an AC voltage to a DC voltage;
    one or more first switches for intermittently providing a positive DC voltage to a first filter input and a negative DC voltage to a second filter input; and
    one or more second switches for intermittently providing a negative DC voltage to the first filter input and a positive DC voltage to the second filter input;
    circuitry operating at greater than about 20 kHz for pulsing the one or more first and second switches to provide variable pulse widths to the filter;
    the filter providing an AC power output having a substantially sinusoidal wave form.

6. The electric welding machine of claim 1 further comprising:
    the power input on the welding machine being configured for receiving a main power voltage of between about 200 and 600 volts AC;

the power input in circuit communication with an AC to DC converter and an inverter that provides power to the main transformer.

7. The electric welding machine of claim 1 wherein the pulse width modulation circuitry limits the power available at the output of the auxiliary power supply on a pulse-by-pulse basis.

8. The electric welding machine of claim 1 wherein pulse width modulation circuitry operates at a frequency of above about 20 kHz.

9. The electric welding machine of claim 8 wherein the pulse width modulation circuitry operates at a frequency of about 75 kHz.

10. An electric welding machine comprising:
an input means for receiving a range of power inputs of between about 200 and 600 volts AC;
the input means in circuit communication with an isolation means for isolating a first AC voltage;
means for reducing the first AC voltage to a first lower AC voltage and a second lower AC voltage:
means for converting the first lower AC voltage to welding output;
means for monitoring the welder output;
means for monitoring an auxiliary power output demand;
means for converting the second lower AC voltage to a DC voltage;
means for converting the DC voltage to a series of pulses and applying the series of pulses to a filter having an output in circuit communication with an auxiliary power output;
means for adjusting the width of the pulses to provide a first power output when a first condition is met, wherein the first power output is substantially a 115 volt sinusoidal output; and
means for adjusting the width of the pulses to provide a second power output when a second condition is met, wherein the second power output is lower than the first power output.

11. The electric welder of claim 10 wherein the means for adjusting the width of the pulses operates at a frequency of above about 20 kHz.

12. The electric welder of claim 10 wherein the first condition comprises the welder power output is off and there is a surge in the demand that exceeds a set limit on the auxiliary power output.

13. The electric welder of claim 10 wherein the second condition comprises the welder power output is on and there is a surge in the demand that exceeds a set limit on the auxiliary power output.

14. A method for controlling an auxiliary power output on a welding machine comprising:
monitoring the demand on an auxiliary power output;
monitoring a welding power output;
determining whether there is a spike in the demand on the auxiliary power output that is above a first limit;
reducing the available power to the auxiliary power output if the spike is above the first limit and the welding power output is energized; and
reducing the available power to the auxiliary power output by reducing a voltage pulse width to an output filter.

15. The method of claim 14 further comprising determining whether the spike in the demand on the auxiliary power output is above a second limit and reducing the power available to the auxiliary power output if the spike is above the second limit and the welding power output is not energized.

16. The method of claim 14 further comprising maintaining the output of the auxiliary power output to be a substantially sinusoidal wave form at about 115 volts and about 60 Hz.

17. The method of claim 14 further comprising further reducing the available power to the auxiliary power output if a pike in the demand on the auxiliary power output extends beyond a predetermined duration.

18. The method of claim 14 further comprising providing power to the welding power output from a first secondary winding, and providing power to the auxiliary power output from a second secondary winding, wherein the first secondary winding and the second secondary winding are in the same transformer.

* * * * *